(12) United States Patent
Steiss

(10) Patent No.: US 9,405,573 B2
(45) Date of Patent: Aug. 2, 2016

(54) SYSTEM AND METHOD FOR PROCESS RUN-TIME PREDICTION

(71) Applicant: CISCO TECHNOLOGY, INC., San Jose, CA (US)

(72) Inventor: Don Steiss, Richardson, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 160 days.

(21) Appl. No.: 14/182,216

(22) Filed: Feb. 17, 2014

(65) Prior Publication Data

US 2015/0234675 A1 Aug. 20, 2015

(51) Int. Cl.
*G06F 9/455* (2006.01)
*G06F 9/46* (2006.01)
*G06F 17/30* (2006.01)
*G06F 17/27* (2006.01)

(52) U.S. Cl.
CPC .............. *G06F 9/46* (2013.01); *G06F 17/2705* (2013.01); *G06F 17/30345* (2013.01)

(58) Field of Classification Search
None
See application file for complete search history.

(56) References Cited

U.S. PATENT DOCUMENTS

| | | | | |
|---|---|---|---|---|
| 2002/0198921 | A1* | 12/2002 | Jameson | G06F 9/4843 718/101 |
| 2007/0283340 | A1* | 12/2007 | Thompson | G06F 3/0481 717/168 |
| 2009/0089784 | A1* | 4/2009 | Walters | G06F 9/4825 718/102 |
| 2013/0262925 | A1* | 10/2013 | Dhanalakoti | G06F 11/1461 714/16 |

OTHER PUBLICATIONS

Tidal Enterprise Scheduler—Reference Guide; Oct. 2007; 598 pages.*

* cited by examiner

*Primary Examiner* — H S Sough
*Assistant Examiner* — Kimberly Jordan
(74) *Attorney, Agent, or Firm* — Polsinelli PC

(57) ABSTRACT

Various embodiments provide process run-time prediction for processes running on server computers. In one embodiment, process run-time of a process is determined by building a database with a history of users, command lines and runtime associated with each command line, and comparing the process with stored records of completed processes in the database. In some embodiments, in response to a determination that the time interval of a process is likely to intersect a planned maintenance period on a server computer, a maintenance notification can be sent to a user of the process and therefore allow the affected process to be migrated to unaffected server computer(s).

20 Claims, 6 Drawing Sheets

| Command 210 | Command database link 220 | Process ID 225 | User Name 230 | Process Start Time 240 | Process End Time 250 | Predicted Duration 260 |

Process Database Record 200

FIG. 2

SYSTEM AND METHOD FOR PROCESS RUN-TIME PREDICTION

TECHNICAL FIELD

The present disclosure relates generally to system and method of run-time prediction for applications or processes running on a server.

BACKGROUND

In the electronic fields and other domains, application software is commonly used for solving specific complex problems. Across applications and problem sets, application run time can be variable and range from seconds to weeks. For example, detailed electrical circuit simulations may be performed using application-specific software to model circuit behavior in response to variations in fabrication or environmental conditions. Changes in the circuit being evaluated or analysis options can alter the execution time of the application. Predicting process run-time of a process can be difficult.

Moreover, application software is often run on server computers in a data center rather than similarly configured personal computers. Hardware and software on server computers are periodically taken off-line for maintenance. This can create some problems for users running applications or processes on affected servers.

Therefore, solutions for predicting process run-time of processes running on server computers and/or providing user notification of schedule maintenance(s) are desired.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example of a process database record in a database entry in accordance with various embodiments of the present disclosure;

DETAILED DESCRIPTION

Figure 1:
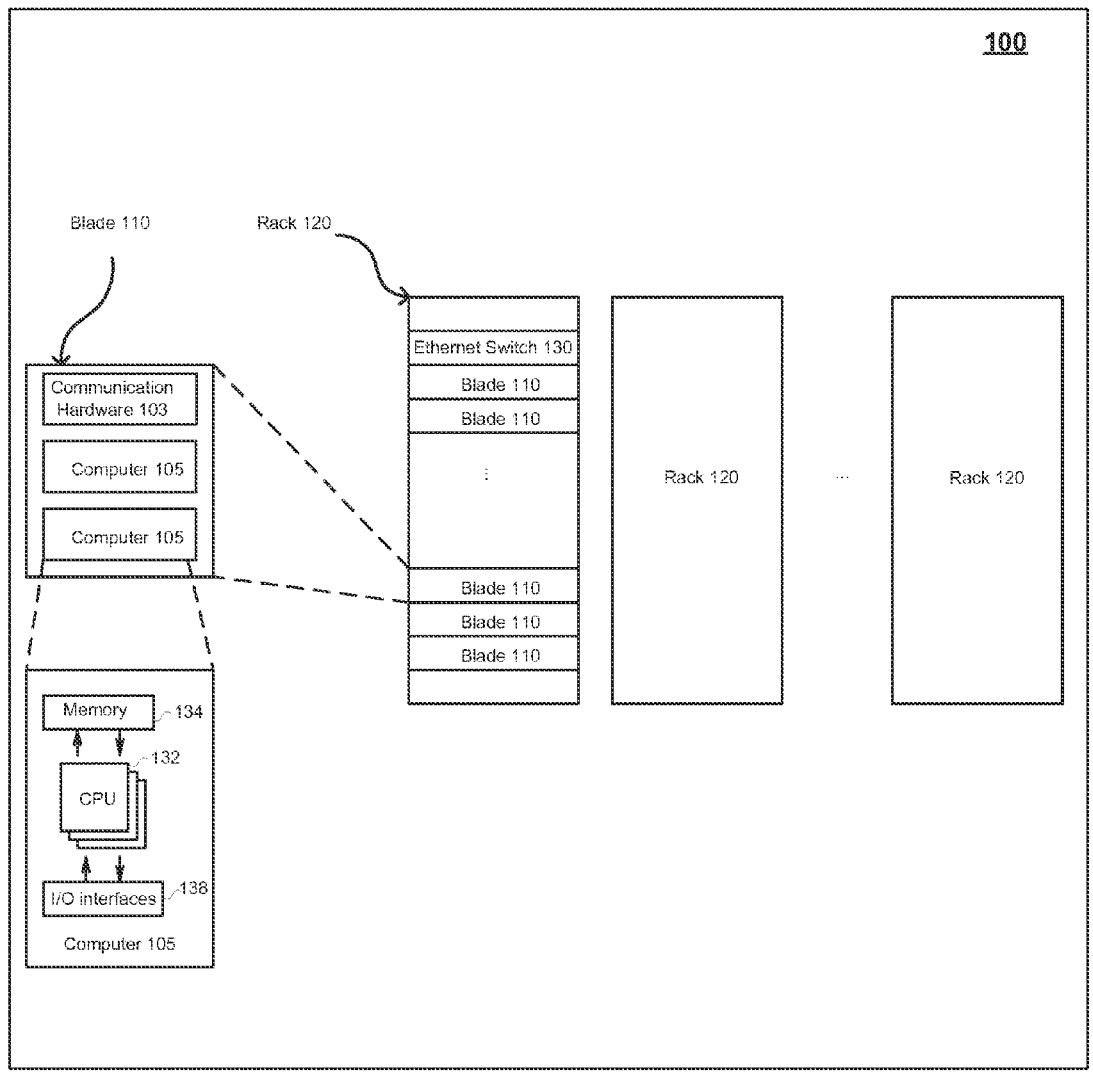
FIG. 1 illustrates an example of server computers in a server farm in accordance with various embodiments of the present disclosure.

Systems and methods in accordance with various embodiments of the present disclosure provide a solution to the above-mentioned problems by providing process run-time estimations for processes running on server computers and determining specific processes that are likely affected by a proposed or scheduled maintenance on affected hardware or software based on the process run-time estimations. More specifically, various embodiments of the present disclosure build a database with a history of users, command lines and runtime associated with each command line, and determine process run-time of a specific process based on stored records of completed processes in the database. In many instances, in response to a determination that the time interval of a process is likely to intersect a planned maintenance period on a server computer, a maintenance notification can be sent to a user of the process and therefore allow the affected process to be migrated to unaffected server computer(s) or hardware(s).

In some embodiments, a database with user histories, command lines and runtime associated with each command line can be dynamically updated. For example, in response to the completion of a process that runs longer than a predetermined time period (e.g., 15 minutes) on server computer(s), a corresponding entry of the process in the database can be updated based on the actual completion time of the process by using a weighted average. In some implementations, the weighted average is a moving average of the process' runtime by weighing more recent records heavier than prior ones. If there is no corresponding entry for the process in the database, a new database entry can be created for the process.

In some embodiments, an entry of a completed process in the database includes a process database record and a command database record associated with the process. The process database record may include fields, such as command, command database link, process identification (ID), user name, process start time, process end time and predicted duration. The command database record may include fields, such as record identifier, command string, command match runtime, command match samples, command prefix runtime, and command prefix samples. In some implementations, the database also contains one or more maintenance event database records. Each maintenance event database record may include fields, such as date and a reason string with a brief explanation of the corresponding maintenance.

In some embodiments, a command string of a new process is parsed into a list of words and converted into a canonical command string. The canonical command string can be associated with a corresponding database entry by comparing the canonical command string with command strings of entries stored in the database. The process run-time of the new process can be estimated based on process information in the corresponding database entry.

In some embodiments, a list of words parsed from a command string can be alphabetically sorted into a new list and assembled into a canonical word list. The canonical word list is then converted into a canonical command string. In some implementations, the first word of the list of parsed word is ignored when generating the new list. The canonical word list is assembled by combining the first word of the parsed words with the new list. The canonical command string can be converted from the canonical word list by sequentially appending words of the canonical word list to a string, with a single white-space character to separate two adjacent words.

In some embodiments, in response to process duration of a process being estimated, the time interval that the process is expected to occupy can be calculated based on process information of a corresponding database entry. For example, the time interval may be estimated based on process start time and predicted duration of the corresponding process database record. A list of maintenance event database records of the corresponding server computers may also be assembled. An index variable can be initiated to point to the first maintenance record. If maintenance start time of the indexed maintenance record intersects the time interval of the process, a maintenance notification can be sent to a user of the process based on information in the corresponding process database record. If the indexed maintenance record does not intersect the time interval of the process or the maintenance notification has been sent to the user of the process, the index variable is incremented to point to the next record in the list of maintenance event database records. The time interval of the process can then be compared with the next maintenance event record. In some embodiments, in response to one or more maintenance event database records being updated, the time intervals of all active application processes are compared with the updated maintenance event records.

Some embodiments provide various algorithms for estimating a process run-time of a process on server computers. In one embodiment, a script can be run to collect application process throughput on multiple resource configurations by using a short partial execution without requiring access to the application source code. Once application process throughput is available, a process run-time of each process can be estimated by multiplying the corresponding throughput with the number of iterations, for example, that may be specified by a user of the process. In another embodiment, a generic and/or greedy search algorithm is used to search for a best template of key process characteristics. Process run-time of a process can be determined from the process run-time of a similar process according to the searched best template. In yet another embodiment, the queue wait time of a process is also determined by analyzing the current state of server computers (e.g., the number of application processes in each queue) and historical data of queue wait times during past similar states. Algorithms, such as first-come first-served (FCFS), least work first (LWF), and backfill scheduling algorithms may be used in estimating queue wait time of a specific process on server computers.

In some embodiments, process run-time predictions are based on statistically gathered data for completed processes of server computers. A process run-time and the time interval of a process can vary over time depending on a current status of a server computer running the process. In some embodiments, extra margins or time guard bands can be dynamically added to the process run-time and the time interval of a process based on historical data of the completed processes. Additionally, a guard band may be included to cover for unknown variables and test inaccuracies.

In some embodiments, application software is executed on server computers that are physically located in a server farm. The server farm may include two or more server computers. In some other embodiments, server computers are physically located across different locations and/or can be cloud servers. Compared with other scenarios, locating server computers in a server farm can sometimes benefit server management, by improving maintenance efficiency and enabling more server computers to be managed concurrently.

FIG. 1 illustrates an example of server computers in a server farm 100 in accordance with various embodiments of the present disclosure. In this example, the server farm 100 comprises two or more racks 120. Each rack 120 includes an Ethernet switch 130 and two or more blades 110. Each blade 110 comprises at least one communication hardware 103 and one or more server computers 105. One blade 110 can communicate with other blades 110, racks 120 and external networks via the at least one communication hardware 103. Depending on the desired implementation, a variety of networking and messaging protocols may be used, including but not limited to TCP/IP, OSI, FTP, UPnP, NFS, CIFS and AppleTalk. As would be appreciated by those skilled in the art, the server farm illustrated in FIG. 1 is used for purposes of explanation, a server farm may be implemented with many variations, as appropriate, in the configuration of the server computers, blades, racks and network components in accordance with various embodiments the present disclosure.

In FIG. 1, the server computer 105 includes at least one central processing unit (CPU) 132 for executing instructions that can be stored in a memory device, such as element 134. As would be apparent to one of ordinary skill in the art, the server computer 105 can include many types of memory, data storage, or computer-readable media, such as a data storage for program instructions for execution by the at least one CPU 132 and/or being used for storing data, a removable memory available for sharing information with other devices, and any number of computing approaches available for sharing with other server computers.

The example server computer 105 might also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art.

The example server computer 105 may also include a power system, such as conventional plug-in approaches, a battery operable to be recharged through conventional plug-in approaches, or through other approaches such as wireless (e.g., capacitive or inductive) charging through proximity with a power mat or other such device. Various other elements and/or combinations are possible as well within the scope of various embodiments.

In some embodiments, the server computer 105 can include at least one input/output (I/O) interface 138 able to receive conventional input from a user and display output to the user. The conventional input can include, for example, a keyboard, push button, touch pad, touch screen, wheel, joystick, keyboard, mouse, keypad, or any other such device or element whereby a user can input a command or a request for additional product information to the device. These I/O devices may also be connected using a wireless infrared or Bluetooth or other link. Some server computers 105 also can include a microphone or other audio capture element that accepts voice or other audio commands. For example, a server computer 105 might not include any buttons at all, but might be controlled only through a combination of visual and audio commands, such that a user can control server computer 105 without having to engage in physical contact with the server computer 105. In certain aspects, server computer 105 may include a display element, such as a screen, touch screen, electronic ink (e-ink), organic light emitting diode (OLED) or liquid crystal display (LCD), and might convey information via other means, such as through audio speakers.

Some embodiments organize software running on server computer 105 as processes. A process is an independent sequence of instructions, as well as the context of those instructions, which can include the state of memory, the state of memory management hardware and/or software, and the state of input/output hardware and software. In many instances, one or more processes may be running concurrently on server computer 105. In some implementations, a single process corresponds to a single application program.

In some embodiments, operating systems assess and provide information about running processes on server computer 105. The information of running processes can include, but is not limited to, whether or not a process is running, the memory consumption of the process, the number of interrupts the process has received, and the command that was used to start the process. The process information can be periodically acquired, processed and stored in a process database record.

FIG. 2 illustrates an example of a process database record 200 in a database entry in accordance with various embodiments of the present disclosure. In this example, the process database record 200 contains fields such as, command 210, command database link 220, process identification (ID) 225, user name 230, process start time 240, process end time 250, and predicted duration 260. Process information about completed commands can be stored in the database and used to model and predict the run time of a new process.

Figure 3:
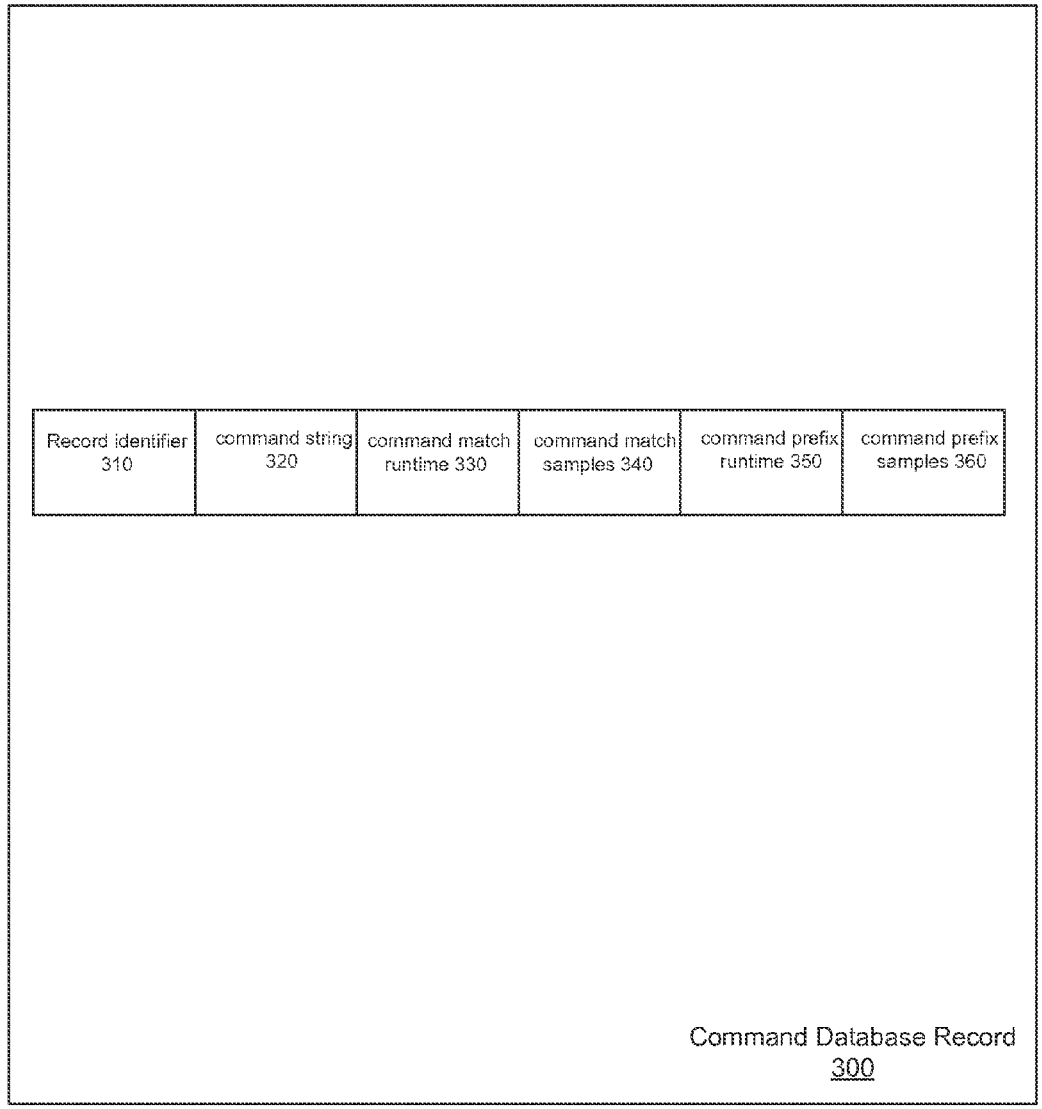
FIG. 3 illustrates an example of a command database record in a database entry in accordance with various embodiments of the present disclosure.

FIG. 3 illustrates an example of a command database record 300 in a database entry in accordance with various embodiments of the present disclosure. In this example, the command data record contains fields such as, record identifier 310, command string 320, command match runtime 330, command match samples 340, command prefix runtime 350, and command prefix samples 360. Record identifier 310 can be used in conjunction with a command database link to associate a process database record with a command data record. Command string 320 is the canonical form of a command that created a process to lead to the creation of the current record 300. Command match runtime 330 is a dynamic numeric value that can be used to predict process run time when there is an exact match between a new canonical command string (e.g., of a new process) and the command string 320 of the current record 300. Command match samples 340 is a dynamic numeric value that increments when a process completes with an exact match between the process' canonical command string and the command string 320 of the current record 300. Command prefix runtime 350 is a dynamic numeric value that can be used to predict the process run time when there is a longest prefix match between a new process' canonical command string and the command string 320 of the current record 300. Command prefix samples 360 is a dynamic numeric value that increments when a process completes with a longest prefix match between the process' canonical command string and the command string 320 of the current record 300.

Figure 4:
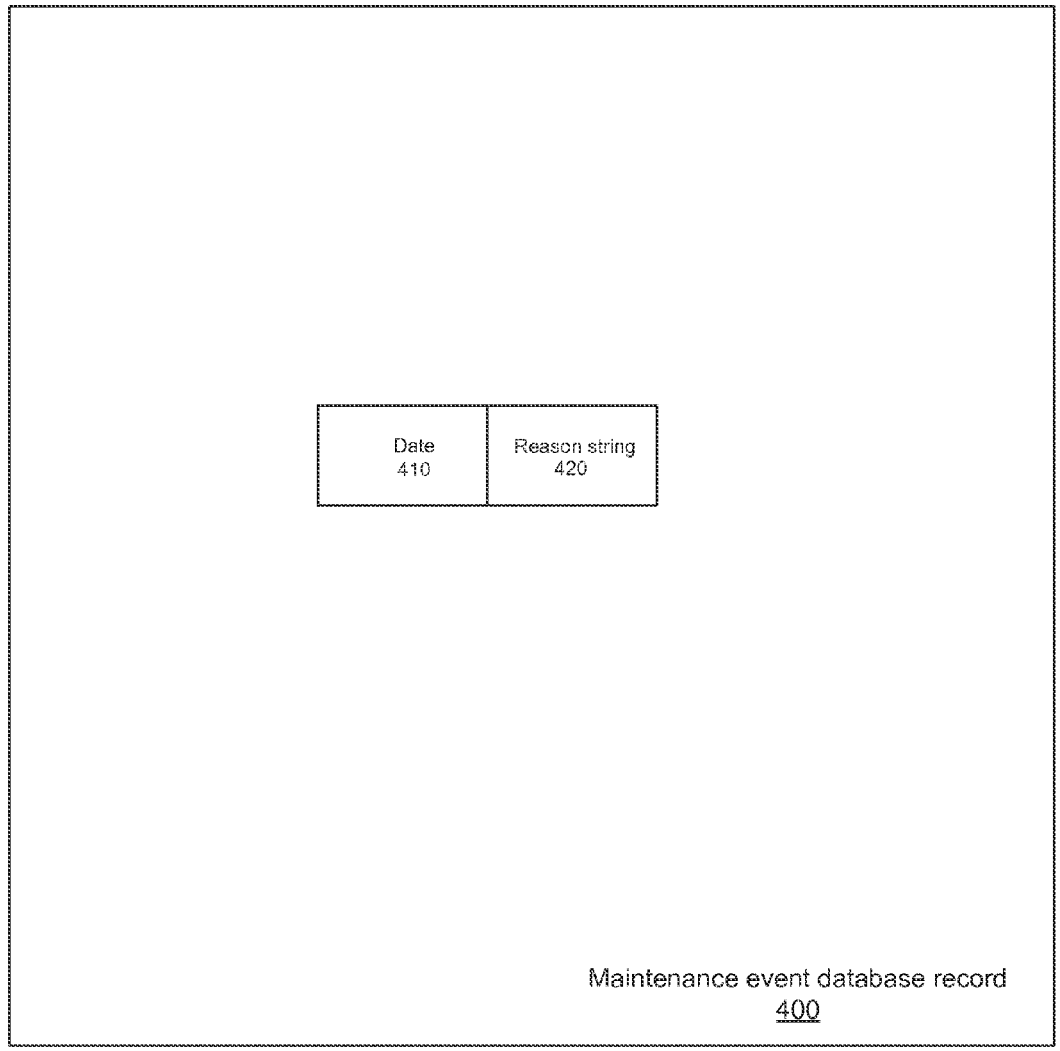
FIG. 4 illustrates an example of a maintenance event database record in accordance with various embodiments of the present disclosure.

In some embodiments, maintenance start times of server computers 105 are stored in the same database as that stores process records of completed processes, or can be stored in a separate database. The database that contains maintenance event database records can be accessed and updated. FIG. 4 illustrates an example of a maintenance event database record 400 in accordance with various embodiments of the present disclosure. In this example, a maintenance event database record 400 contains two fields: Date 410 and Reason string 420. The Date 410 contains the start time of a maintenance event in a specific time zone or Coordinated Universal Time (UTC). The Reason string 420 contains an ASCII string that provides a description of the maintenance event in the Date 410.

Figure 5:
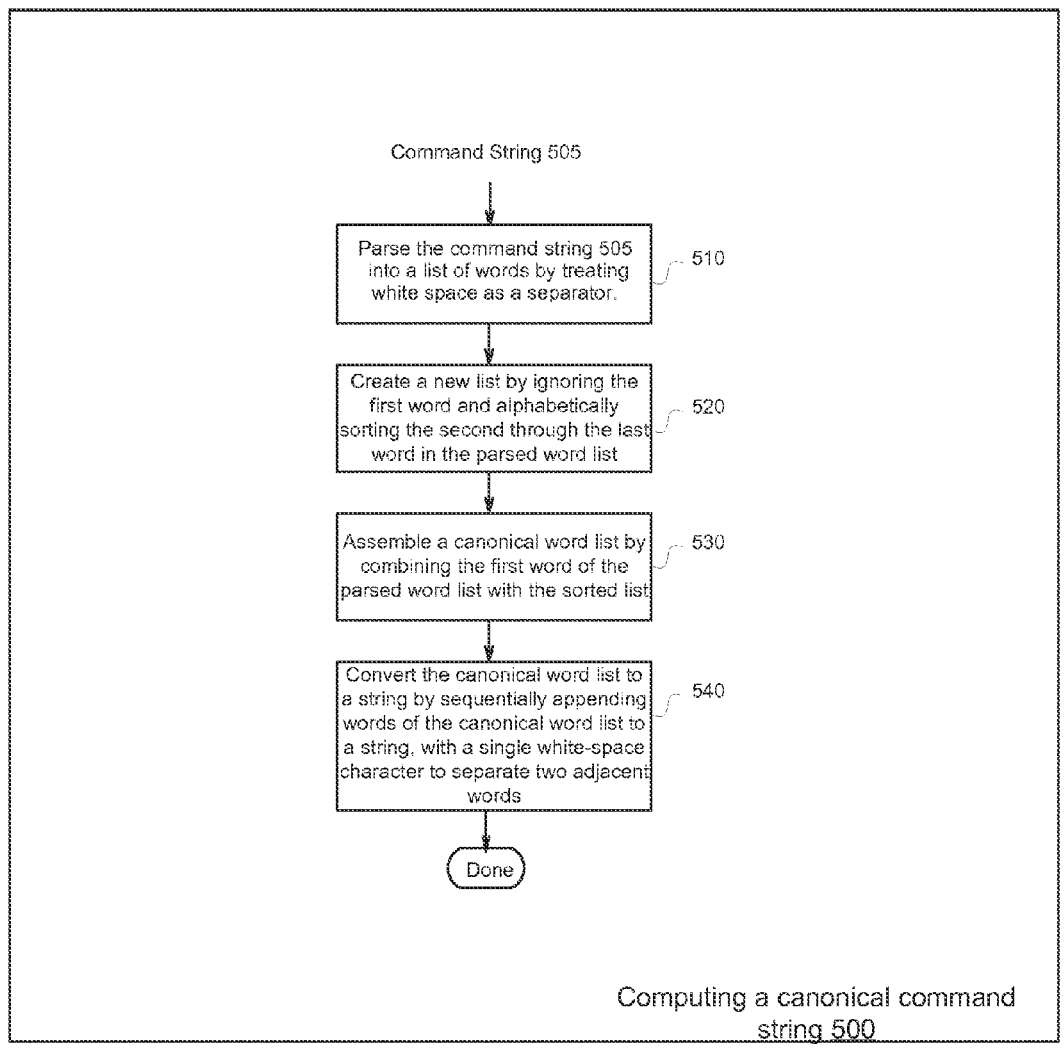
FIG. 5 illustrates an example process of converting a command string into a canonical command string in accordance with various embodiments of the present disclosure.

Certain aspects of the disclosure provide a method for converting a command string into a canonical command string. In certain aspects, methods of the subject technology can provide steps that form part of a process for predicting the run time of an application process. In another aspect, methods of the technology can be used to convert different command line formats (e.g., for a common application) into a similar, or identical, string. FIG. 5 illustrates an example process 500 for converting a command string into a canonical command string in accordance with various embodiments of the present disclosure. At step 510, a command string 505 can be read and parsed into a list of words by treating spans of one or more white-space characters as separators.

In step 520, a new list of words is created by ignoring the first word and alphabetically sorting the second word through the last of the list of parsed words. A canonical word list can be assembled at step 530 by combining the first word of the parsed word list from step 510 with the sorted word list from step 520. The canonical word list created at step 530 can be converted into a string at step 540. Each word in the canonical word list is sequentially appended to an initially-empty string, using one or more white-space characters to separate adjacent words.

The example process 500 for converting a command string into a canonical command string can be implemented in various computer languages. For example, the process 500 can be implemented with the Tool Command Language (TCL), as shown below:

```
proc canonicalize_cmd { cmd } {
return [concat [lindex $cmd 0] [lsort [lrange $cmd 1 end] ]]
}
```

Figure 6:
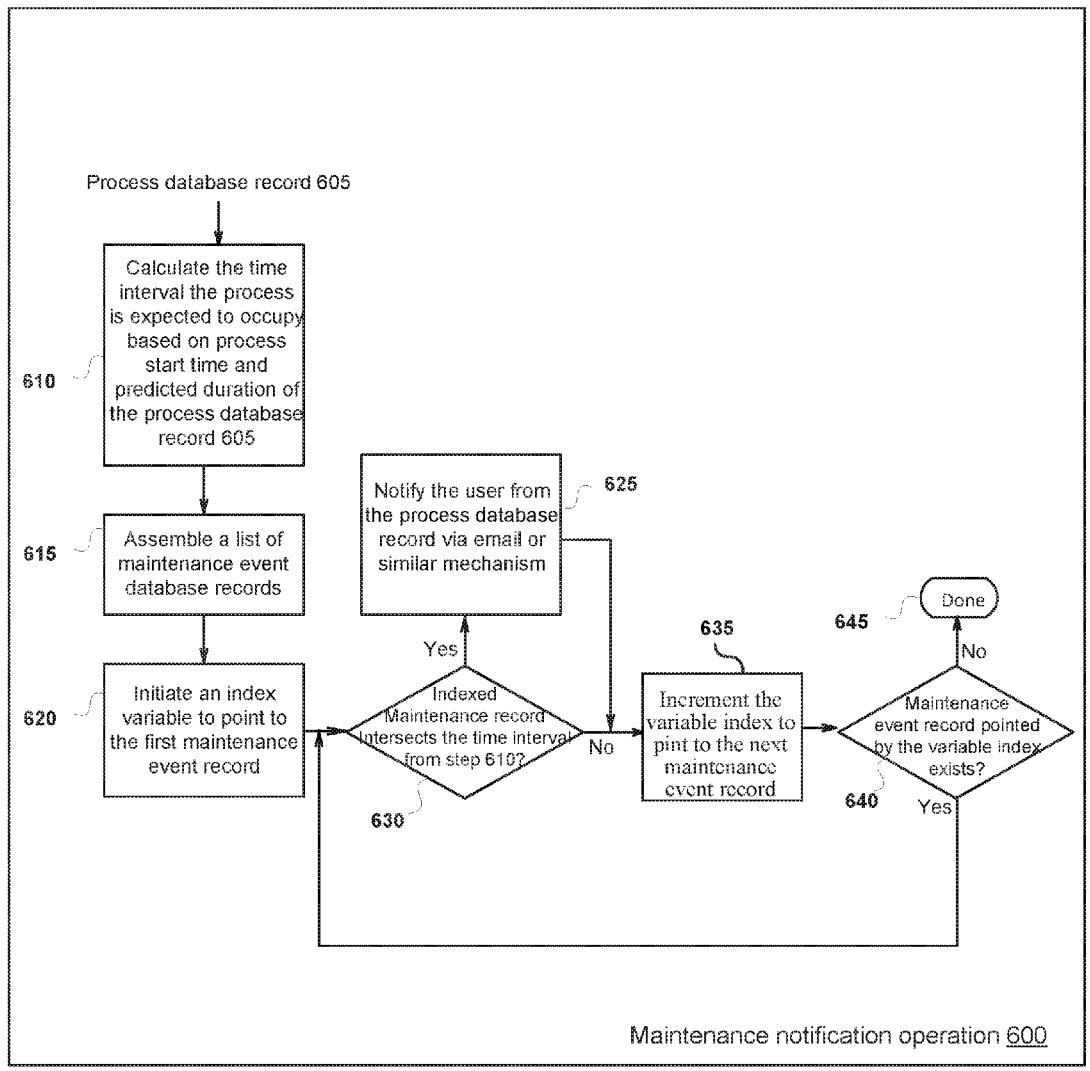
FIG. 6 illustrates an example process of a maintenance notification operation in accordance with various embodiments of the present disclosure.

Some embodiments of the present disclosure provide methods for providing a maintenance notification to a user of a process that is likely affected by a proposed or scheduled maintenance event. FIG. 6 illustrates an example process for performing a notification operation 600 in accordance with various embodiments of the present disclosure. The notification operation 600 may be used when a process database record is created or when a maintenance data record is updated. At step 610, the time interval that a process is expected to occupy can be calculated based on process start time and predicted duration of a received process database record 605.

At step 615, a list of maintenance event database records is assembled. An index variable can be initiated, at step 620, to point to the first maintenance event record. At step 630, the indexed maintenance record is compared with the time interval computed at step 610. If there is an intersection, then user name field of the process database record 605 can be used, at step 625, to construct and send an email or other similar messaging mechanism to the user that initiated the process. In some implementations, the contents of the message may include the content of reason string field from the indexed maintenance record. If there is no intersection or the step 625 has been executed, the value in the variable holding index is incremented to point to the next maintenance event record in the maintenance event database record list.

A decision step 640 is executed to determine whether the index variable is pointed to an existing maintenance event database record. If yes, then step 630 is executed again to compare the indexed maintenance record with the time interval computed at step 610. If no, the process ends at step 645.

Various embodiments of the present disclosure provide methods for predicting process run-time and providing maintenance notifications to users likely affected by a proposed or scheduled maintenance event. Exemplary pseudocode for predicting run-time and providing user maintenance notifications is provided below.

```
LOOP forever
   Obtain the list of running processes
   // handle new processes
   FOR EACH running process
      IF the running process has a corresponding entry in the process database THEN
         update the process end time 250 field to the current time
      ELSE
         // no corresponding entry in the process database
         construct a new process database record 200 for the current process
         generate the canonical form of the command that started the process according to the flow chart in FIG. 5
         store the process ID in field process ID 225
         store the canonical command in field command 210
         store user name in field user name 230
         store the current time in field process start time 230
         store the current time in field process end time 240
         execute a longest-prefix-match search on all command database entries with the contents of field command 210
         store the value of the matching command database record 300 field record identifier 310 in field command database link 220
         IF command with the longest prefix match is an exact match THEN
            retrieve the value of field Command match runtime 330 using field command database link 220
            store the retrieved value in field predicted duration 260
         ELSE
            retrieve the value of field Command prefix runtime 350 using field command database link 220
            store the retrieved value in field predicted duration 260
         END IF
         check the process record for intersection with scheduled maintenance as described in FIG. 6.
      END IF
   END FOR EACH
   // handle finished processes
   FOR EACH process database record
      IF the process ID 225 field of current process database record does not match any running process THEN
         // the process must have finished
         IF command database entry located by field command database link 220 is an exact match
         THEN
            // update exact match fields in command record
            set the command database record field command match runtime 330 to the weighted average of the observed duration and the current value of field command match runtime 330
            increment the value of field command match samples 340
         ELSE
            // update prefix match in command record
            set the command database record field command prefix runtime 350 to the weighted average of the observed duration and the current value of field command prefix runtime 350
            increment the value of field command prefix samples 360
            IF actual process duration is greater than 15 minutes THEN
               // create new command database record
               construct a new command database record 300 for the command from the current process record
               set the new command database record field record identifier 310 to a new identifier
               set the new command database record field command string 320 to the value of field command 210
               set the new command database record field command match runtime 330 to the actual process duration
               set the new command database record field command match samples 340 to 1
               set the new command database record field command prefix runtime 350 to the actual process duration
               set the new command database record field command prefix samples 360 to 1
            END IF
         END IF
      END IF
   END FOR EACH
   // handle maintenance database updates
   IF the last-modified time of the maintenance event database has changed since the last loop
   THEN
      FOR EACH process database record
         check the process record for intersection with scheduled maintenance as described in FIG. 6.
      END FOR EACH
   END IF
   sleep for 5 minutes
END LOOP
```

While specific examples have been cited above showing how the subroutine return operation may be employed in different instructions, other embodiments may incorporate the subroutine operation into different instructions. For clarity of explanation, in some instances the present disclosure may be presented as including individual functional blocks including functional blocks comprising devices, device components, steps or routines in a method embodied in software, or combinations of hardware and software.

The various embodiments can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    converting a command string of a process into a canonical command string, the process running on a computing device;
    associating the canonical command string with an entry stored in a database, wherein the database includes a plurality of entries with each entry containing process information of a completed process that ran longer than a predetermined time period, and the database includes one or more maintenance records of the computing device, each maintenance record comprising a date and time and a description of the corresponding maintenance;
    determining a process run-time estimation of the process based on information stored in the corresponding entry;
    in response to completion of the process and a determination that the process ran longer than the predetermined time period, updating the corresponding entry stored in the database;
    determining a time interval that the process is expected to occupy based at least upon the process run-time estimation of the process;
    comparing the time interval of the process with the one or more maintenance records of the computing device; and
    in response to determining that the time interval of the process overlaps with a specific maintenance associated with the one or more maintenance records, sending a maintenance notification of the specific maintenance to a user of the process.

2. The computer-implemented method of claim 1, wherein the corresponding entry contains a command string that either has an exact match or a longest prefix match with the canonical command string.

3. The computer-implemented method of claim 2, wherein the corresponding entry stored in the database is updated by using a weighted average.

4. The computer-implemented method of claim 2, further comprising:
    in response to completion of the process, a determination that the process ran longer than the predetermined time period, and a determination that there is neither exact match nor longest prefix match between the canonical command string and any command string in the plurality of entries, creating a new entry containing process information of the process.

5. The computer-implemented method of claim 1, wherein each of the plurality entries in the database includes a process database record and a command database record.

6. The computer-implemented method of claim 5, wherein the process database record comprises a plurality of fields including command, command database link, process identification (ID), user name, process start time, process end time and predicted duration.

7. The computer-implemented method of claim 5, wherein the command database record comprises a plurality of fields including record identifier, command string, command match runtime, command match samples, command prefix runtime, and command prefix samples.

8. The computer-implemented method of claim 1, wherein the converting comprises:
    parsing the command string of the process into a list of words; and
    converting the list of words into the canonical command string.

9. The computer-implemented method of claim 8, wherein the converting the list of words into the canonical command string comprises:
    alphabetically sorting the list of words into a new list;
    assembling the sorted new list into a canonical word list; and
    converting the canonical word list into the canonical command string by sequentially appending words of the canonical word list to a string, with a single white-space character to separate two adjacent words.

10. The computer-implemented method of claim 1, further comprising:
    dynamically adjusting margins added to the process run-time estimation and the time interval of the process based on historical process information of completed processes.

11. The computer-implemented method of claim 1, further comprising:
    in response to a determination that one of the one or more maintenance records has been updated, comparing the updated maintenance record with the time interval of the process; and
    in response to determining that a particular maintenance of the updated maintenance record overlaps the time interval of the process, sending a maintenance notification of the particular maintenance to a user of the process based on information stored in the corresponding entry.

12. A system, comprising:
    at least one processor; and
    memory including instructions that, when executed by the at least one processor, cause the system to:
        convert a command string of a process into a canonical command string, the process running on the system;
        associate the canonical command string with an entry stored in a database, wherein the database includes a plurality of entries with each entry containing process information of a completed process that ran longer than a predetermined time period, and the database includes one or more maintenance records of the computing device, each maintenance record comprising a date and time and a description of the corresponding maintenance;
        determine a process run-time estimation of the process based on information stored in the corresponding entry;
        in response to completion of the process and a determination that the process ran longer than the predetermined time period, update the corresponding entry stored in the database;
        determine a time interval that the process is expected to occupy based at least upon the process run-time estimation of the process;
        compare the time interval of the process with the one or more maintenance records of the computing device; and in response to determining that the time interval of the process overlaps with a specific maintenance associated with the one or more maintenance records, send a maintenance notification of the specific maintenance to a user of the process.

13. The system of claim 12, wherein the instructions when executed further cause the system to:
dynamically adjust margins added to the process run-time estimation and the time interval of the process based on historical process information of completed processes.

14. The system of claim 12, wherein the instructions when executed further cause the system to:
in response to a determination that one of the one or more maintenance records has been updated, compare the updated maintenance record with the time interval of the process; and
in response to determining that a particular maintenance of the updated maintenance record overlaps the time interval of the process, send a maintenance notification of the particular maintenance to a user of the process based on information stored in the corresponding entry.

15. The system of claim 12, wherein the corresponding entry contains a command string that either has an exact match or a longest prefix match with the canonical command string.

16. The system of claim 12, wherein the corresponding entry stored in the database is updated by using a weighted average.

17. The system of claim 12, wherein the instructions when executed further cause the system to:
in response to completion of the process, a determination that the process ran longer than the predetermined time period, and a determination that there is neither exact match nor longest prefix match between the canonical command string and any command string in the plurality of entries, create a new entry containing process information of the process.

18. A non-transitory computer-readable storage medium including instructions that, when executed by at least one processor of a computing system, cause the computing system to:
convert a command string of a process into a canonical command string, the process running on the computing system;
associate the canonical command string with an entry stored in a database, wherein the database includes a plurality of entries with each entry containing process information of a completed process that ran longer than a predetermined time period, and the database includes one or more maintenance records of the computing device, each maintenance record comprising a date and time and a description of the corresponding maintenance;
determine a process run-time estimation of the process based on information stored in the corresponding entry;
in response to completion of the process and a determination that the process ran longer than the predetermined time period, update the corresponding entry stored in the database;
determine a time interval that the process is expected to occupy based at least upon the process run-time estimation of the process;
compare the time interval of the process with the one or more maintenance records of the computing device; and
in response to determining that the time interval of the process overlaps with a specific maintenance associated with the one or more maintenance records, send a maintenance notification of the specific maintenance to a user of the process.

19. The non-transitory computer-readable storage medium of claim 18, wherein the convert comprises:
parse the command string of the process into a list of words; and
convert the list of words into the canonical command string.

20. The non-transitory computer-readable storage medium of claim 19, wherein the convert the list of words into the canonical command string comprises:
alphabetically sorting the list of words into a new list;
assembling the sorted new list into a canonical word list; and
converting the canonical word list into the canonical command string by sequentially appending words of the canonical word list to a string, with a single white-space character to separate two adjacent words.

\* \* \* \* \*